(12) United States Patent
Brown et al.

(10) Patent No.: US 7,685,395 B1
(45) Date of Patent: Mar. 23, 2010

(54) SPANNING VIRTUAL ARRAYS ACROSS MULTIPLE PHYSICAL STORAGE ARRAYS

(75) Inventors: Jeffrey A. Brown, Shrewsbury, MA (US); Kiran Madnani, Framingham, MA (US); Adi Ofer, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 528 days.

(21) Appl. No.: 11/427,646

(22) Filed: Jun. 29, 2006

Related U.S. Application Data

(63) Continuation-in-part of application No. 11/318,757, filed on Dec. 27, 2005.

(51) Int. Cl.
*G06F 12/00* (2006.01)
(52) U.S. Cl. ..................................... 711/170
(58) Field of Classification Search ........................ None
See application file for complete search history.

(56) References Cited

U.S. PATENT DOCUMENTS

| | | | |
|---|---|---|---|
| 5,568,629 | A | 10/1996 | Gentry et al. |
| 5,963,555 | A | 10/1999 | Takase et al. |
| 6,336,152 | B1 * | 1/2002 | Richman et al. ............... 710/8 |
| 6,421,711 | B1 | 7/2002 | Blumenau et al. |
| 6,563,834 | B1 | 5/2003 | Ogawa |
| 6,684,209 | B1 | 1/2004 | Ito et al. |
| 6,839,750 | B1 | 1/2005 | Bauer et al. |
| 6,944,785 | B2 | 9/2005 | Gadir et al. |
| 7,043,663 | B1 * | 5/2006 | Pittelkow et al. ............. 714/4 |
| 7,051,101 | B1 | 5/2006 | Dubrovsky et al. |
| 7,120,728 | B2 * | 10/2006 | Krakirian et al. ............ 711/6 |
| 7,124,143 | B2 | 10/2006 | Matsunami et al. |
| 7,260,737 | B1 | 8/2007 | Lent et al. |
| 7,318,120 | B2 * | 1/2008 | Rust et al. .................. 711/114 |
| 7,340,639 | B1 | 3/2008 | Lee et al. |
| 7,366,846 | B2 * | 4/2008 | Boyd et al. ................. 711/144 |
| 7,433,948 | B2 * | 10/2008 | Edsall et al. ............... 709/224 |

(Continued)

FOREIGN PATENT DOCUMENTS

EP          1130514 A2       9/2001

(Continued)

OTHER PUBLICATIONS

Office Action mailed Mar. 19, 2008 for U.S. Appl. No. 11/427,759.

(Continued)

*Primary Examiner*—Hiep T Nguyen
(74) *Attorney, Agent, or Firm*—Guerin & Rodriguez, LLP; Michael A. Rodriguez

(57) ABSTRACT

Described are a storage network and method of presenting a virtual array in the storage network. The storage network includes a first storage array and a second storage array. At least one of the first and second storage arrays has one or more logical units of storage assigned to a virtual array that spans the first and second storage arrays. In addition, at least one of the first and second storage arrays has one or more physical ports coupled to the virtual array. The virtual array is assigned a unique virtual port identifier (ID) for each physical port coupled to the virtual array. A host coupled to a switch can communicate with the virtual array using a virtual port ID assigned to the virtual array.

22 Claims, 14 Drawing Sheets

U.S. PATENT DOCUMENTS

| | | |
|---|---|---|
| 7,500,134 B2 | 3/2009 | Madnani et al. |
| 2002/0071386 A1 | 6/2002 | Gronke |
| 2003/0018927 A1 | 1/2003 | Gadir et al. |
| 2003/0131182 A1 | 7/2003 | Kumar et al. |
| 2004/0133576 A1 | 7/2004 | Ito et al. |
| 2004/0151188 A1* | 8/2004 | Maveli et al. ............ 370/398 |
| 2004/0177228 A1 | 9/2004 | Leonhardt et al. |
| 2004/0213272 A1 | 10/2004 | Nishi et al. |
| 2004/0243710 A1 | 12/2004 | Mao |
| 2005/0008016 A1 | 1/2005 | Shimozono et al. |
| 2005/0010688 A1 | 1/2005 | Murakami et al. |
| 2005/0120160 A1* | 6/2005 | Plouffe et al. .............. 711/1 |
| 2005/0251620 A1 | 11/2005 | Matsunami et al. |
| 2006/0064466 A1 | 3/2006 | Shiga et al. |
| 2006/0080516 A1 | 4/2006 | Paveza et al. |
| 2006/0107010 A1 | 5/2006 | Hirezaki et al. |
| 2006/0155777 A1 | 7/2006 | Shih et al. |
| 2006/0190698 A1 | 8/2006 | Mizuno et al. |
| 2007/0234342 A1 | 10/2007 | Flynn et al. |
| 2008/0005468 A1* | 1/2008 | Faibish et al. ............ 711/114 |

FOREIGN PATENT DOCUMENTS

| | | |
|---|---|---|
| EP | 1357465 A | 10/2003 |
| WO | 03/062979 A | 7/2003 |

OTHER PUBLICATIONS

Office Action mailed Mar. 20, 2008 for U.S. Appl. No. 11/427,731.
Office Action mailed Mar. 20, 2008 for U.S. Appl. No. 11/427,744.
Office Action mailed Mar. 18, 2008 for U.S. Appl. No. 11/427,749.
Notice of Allowance mailed Jun. 12, 2008 for U.S. Appl. No. 11/318,675.
Office Action mailed Jul. 16, 2008 for U.S. Appl. No. 11/318,757.
Charles Millilgan et al., Online Storage Virtualization: The key to managing the data explosion, Proceedings of the 35th Hawaii International Conference on System Sciences, 2002, IEEE.
Madnani; U.S. Appl. No. 11/318,757, filed Dec. 27, 2005; 35 pages.
Ofer; U.S. Appl. No. 11/318,719, filed Dec. 27, 2005; 73 pages.
Madnani; U.S. Appl. No. 11/318,675, filed Dec. 27, 2005; 90 pages.
Ofer.; U.S. Appl. No. 11/318,734, filed Dec. 27, 2005; 75 pages.
Ofer, et al.; U.S. Appl. No. 11/427,759, filed Jun. 29, 2006; 76 pages.
Ofer, et al.; U.S. Appl. No. 11/427,724, filed Jun. 29, 2006; 78 pages.
Madnani, et al.; U.S. Appl. No. 11/427,731, filed Jun. 29, 2006; 82 pages.
Madnani, et al.; U.S. Appl. No. 11/427,744, filed Jun. 29, 2006; 83 pages.
Ofer, et al.; U.S. Appl. No. 11/427,749, filed Jun. 29, 2006; 76 pages.
Office Action for U.S. Appl. No. 11/318,734 mailed Sep. 22, 2008 (44 pages).
Office Action for U.S. Appl. No. 11/318,719 mailed Sep. 17, 2008 (21 pages).
Office Action mailed Jun. 22, 2009 for U.S. Appl. No. 11/318,757.
Office Action mailed Jul. 20, 2009 for U.S. Appl. No. 11/427,724.
Office Action mailed Sep. 22, 2008 for U.S. Appl. No. 11/318,734.
Office Action mailed Oct. 1, 2008 for U.S. Appl. No. 11/318,719.
Office Action mailed Dec. 9, 2008 for U.S. Appl. No. 11/427,724.
Final Office Action mailed Sep. 17, 2008 for U.S. Appl. No. 11/427,749.
Office Action mailed Mar. 17, 2009 for U.S. Appl. No. 11/427,759.
Office Action mailed Apr. 27, 2009 for U.S. Appl. No. 11/427,731.
Office Action mailed Apr. 27, 2009 for U.S. Appl. No. 11/427,744.
Office Action mailed Apr. 27, 2009 for U.S. Appl. No. 11/427,749.
Office Action mailed May 7, 2009 for U.S. Appl. No. 11/318,734.
Office Action mailed May 11, 2009 for U.S. Appl. No. 11/318,719.

* cited by examiner

| PORT NAME | PORT ID |
|---|---|
| apa | 0 |
| apb | 1 |
| | |
| | |

FIG. 4

| PORT NAME | PORT ID | VIRTUAL PORT NAME | VIRTUAL PORT ID |
|---|---|---|---|
| apa | 0 | vn0 | v0 |
| apa | 0 | vn1 | v1 |
| apa | 0 | vn2 | v2 |
| apb | 1 | vn3 | v3 |
| apb | 1 | vn4 | v4 |
| apb | 1 | vn5 | v5 |

| LUN NAME | PORT ID | LUN # |
|---|---|---|
| a0 | 0 | L00 |
| b0 | 0 | L01 |
| c0 | 0 | L02 |
| d0 | 0 | L10 |
| e0 | 0 | L11 |
| f0 | 0 | L12 |
| g0 | 0 | L20 |
| h0 | 0 | L21 |
| i0 | 0 | L22 |
| j0 | 0 | L30 |
| k0 | 0 | L31 |
| l0 | 0 | L32 |
| m0 | 0 | L40 |
| n0 | 0 | L41 |
| p0 | 0 | L42 |
| q0 | 0 | L50 |
| r0 | 0 | L51 |
| s0 | 0 | L52 |
| a1 | 1 | L60 |
| b1 | 1 | L61 |
| c1 | 1 | L62 |
| d1 | 1 | L70 |
| e1 | 1 | L71 |
| f1 | 1 | L72 |
| g1 | 1 | L80 |
| h1 | 1 | L81 |
| i1 | 1 | L82 |
| j1 | 1 | L90 |
| k1 | 1 | L91 |
| l1 | 1 | L92 |

| LUN NAME | VIRTUAL PORT ID | LUN # |
|---|---|---|
| a0 | v0 | L00 |
| b0 | v0 | L01 |
| c0 | v0 | L02 |
| d0 | v0 | L10 |
| e0 | v0 | L11 |
| f0 | v0 | L12 |
| g0 | v1 | L20 |
| h0 | v1 | L21 |
| i0 | v1 | L22 |
| j0 | v1 | L30 |
| k0 | v1 | L31 |
| l0 | v1 | L32 |
| m0 | v2 | L40 |
| n0 | v2 | L41 |
| p0 | v2 | L42 |
| q0 | v2 | L50 |
| r0 | v2 | L51 |
| s0 | v2 | L52 |
| a1 | v3 | L60 |
| b1 | v3 | L61 |
| c1 | v3 | L62 |
| d1 | v3 | L70 |
| e1 | v3 | L71 |
| f1 | v3 | L72 |
| g1 | v4 | L80 |
| h1 | v4 | L81 |
| i1 | v4 | L82 |
| j1 | v4 | L90 |
| k1 | v4 | L91 |
| l1 | v4 | L92 |
| p0 | v5 | L42 |
| q0 | v5 | L50 |
| r0 | v5 | L51 |
| s0 | v5 | L52 |

| VIRTUAL PORT ID | HOST-FACING PORT ID |
|---|---|
| v0 | 200 |
| v1 | 201 |
| v2 | 202 |
| v3 | 203 |
| v4 | 204 |
| v5 | 202 |

| LUN NAME | VIRTUAL PORT ID | LUN # |
|---|---|---|
| a0 | v0 | L00 |
| b0 | v0 | L01 |
| c0 | v0 | L02 |
| d0 | v0 | L10 |
| e0 | v0 | L11 |
| f0 | v0 | L12 |

| LUN NAME | VIRTUAL PORT ID | LUN # |
|---|---|---|
| g0 | v1 | L20 |
| h0 | v1 | L21 |
| i0 | v1 | L22 |
| j0 | v1 | L30 |
| k0 | v1 | L31 |
| l0 | v1 | L32 |

| 72' | PORT NAME | PORT ID | VIRTUAL PORT NAME | VIRTUAL PORT ID |
|---|---|---|---|---|
| 74' | apa | 0 | vn0 | v0 |
| | apb | 1 | vn1 | v1 |
| | apc | 2 | vn2 | v2 |
| | apd | 3 | vn3 | v3 |

| LUN NAME | VIRTUAL PORT ID | LUN # |
|---|---|---|
| a0 | v0 | L00 |
| b0 | v0 | L01 |
| c0 | v0 | L02 |
| d0 | v0 | L10 |
| e0 | v0 | L11 |
| f0 | v0 | L12 |
| j1 | v1 | L90 |
| k1 | v1 | L91 |
| l1 | v1 | L92 |
| a3 | v2 | L03 |
| b3 | v2 | L04 |
| c3 | v2 | L05 |
| g4 | v3 | L83 |
| h4 | v3 | L84 |
| i4 | v3 | L85 |
| j4 | v3 | L93 |
| k4 | v3 | L94 |
| l4 | v3 | L95 |

84 / 86 / 90

FIG. 15

SPANNING VIRTUAL ARRAYS ACROSS MULTIPLE PHYSICAL STORAGE ARRAYS

RELATED APPLICATION

This application is a continuation-in-part application claiming priority to co-pending U.S. patent application Ser. No. 11/318,757, filed Dec. 27, 2005, titled "Presentation of Virtual Arrays Using N-Port ID Virtualization," the entirety of which U.S. patent application is incorporated by reference herein.

FIELD OF THE INVENTION

The present invention relates generally to storage systems. More particularly, the invention relates to systems and methods of presenting virtual arrays.

BACKGROUND

Today's enterprise data centers store ever-larger amounts of business critical data that must be immediately and continuously available. Ever larger and more complex storage systems are used for storage of the data. Many different hosts and applications access data on these storage systems. To provide security and prevent data corruption, it is often necessary to ensure that the applications and hosts have exclusive access to particular areas of storage in the system.

One mechanism for partitioning storage systems employs the concept of "virtual arrays". Accordingly, software is provided within a storage array to partition the array logically into separate storage groups. Each storage group includes at least one host and a set of logical units of storage. The logical units of storage in the group are accessible only to the hosts in the group. Other hosts cannot access a storage group to which they have not been granted access. Current methods for partitioning storage arrays into virtual arrays, however, can be highly complex and expensive, and operate only at the storage array level. It is desirable to provide a simpler, inexpensive means of presenting virtual arrays to host systems, and to provide a mechanism for centralizing array partitioning from another part of the system, for example, the switch fabric. It is also desirable to be able to migrate data between virtual arrays.

SUMMARY

In one aspect, the invention features a storage network comprising a first storage array and a second storage array. At least one of the first and second storage arrays has one or more logical units of storage assigned to a virtual array that spans the first and second storage arrays. At least one of the first and second storage arrays has one or more physical ports coupled to the virtual array. The virtual array is assigned a unique virtual port identifier (ID) for each physical port coupled to the virtual array.

In another aspect, the invention features a method of presenting a virtual array in a storage network. At least one logical unit of storage in at least one of a first storage array and a second storage array is arranged into a virtual array that spans the first and second storage arrays. The virtual array is coupled to a switch through at least one physical port of at least one of the first and second storage arrays. A unique virtual port identifier (ID) is assigned to the virtual array for each physical port that couples the virtual array to the switch.

In still another aspect, the invention features a system including a host and a virtual array spanning a plurality of storage arrays. At least one of the storage arrays has one or more logical units of storage assigned to the virtual array and at least one of the storage arrays has a physical port coupled to the virtual array. The virtual array is assigned a unique virtual port identifier (ID) for each physical port coupled to the virtual array. The host communicates with the virtual array using a virtual port ID assigned to the virtual array.

BRIEF DESCRIPTION OF THE DRAWINGS

The advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 4 is an exemplary representation of a name server table resident in the switch fabric.

FIG. 5 is an exemplary representation of a LUN table used by hosts to map LUN numbers to port IDs and LUN names.

FIG. 7 is an exemplary representation of a name server table resident in the switch fabric used to map port names and IDs to virtual port names and virtual port IDs.

FIG. 8 is an exemplary representation of a LUN table used by hosts to map LUN names to virtual port IDs and LUN numbers FIG. 9 is an exemplary representation of a zoning table used to determine which hosts may access which virtual array.

FIG. 10 is an exemplary representation of a LUN table at a first host when the zoning table in the switch is operational.

FIG. 11 is an exemplary representation of a LUN table in a second host when the zoning table in the switch is operational.

FIG. 14 is an exemplary representation of a name server table maintained by the switch for use in communicating with the virtual array of FIG. 13 that spans multiple physical storage arrays.

FIG. 15 is an exemplary representation of a LUN table at a host for use in communicating with the virtual array of FIG. 13 that spans multiple physical storage arrays.

DETAILED DESCRIPTION

Storage systems constructed in accordance with the invention present virtual arrays to hosts and host applications through a switch fabric. In accordance with the invention, a presented virtual array can span multiple physical storage arrays, as described herein. Each virtual array represents a distinct group of logical units of storage (LUN), each LUN of a physical storage array belonging to no more than one virtual array. The switch fabric assigns a virtual port identifier (IDs) to each physical port coupled to a virtual array (there can be more than one such physical port for a given virtual array). The hosts and host applications use these virtual port IDs to communicate with the LUNs. For virtual arrays that span multiple physical storage arrays, the LUNs also span these physical storage arrays and may be accessed through any one of them.

Figure 1:
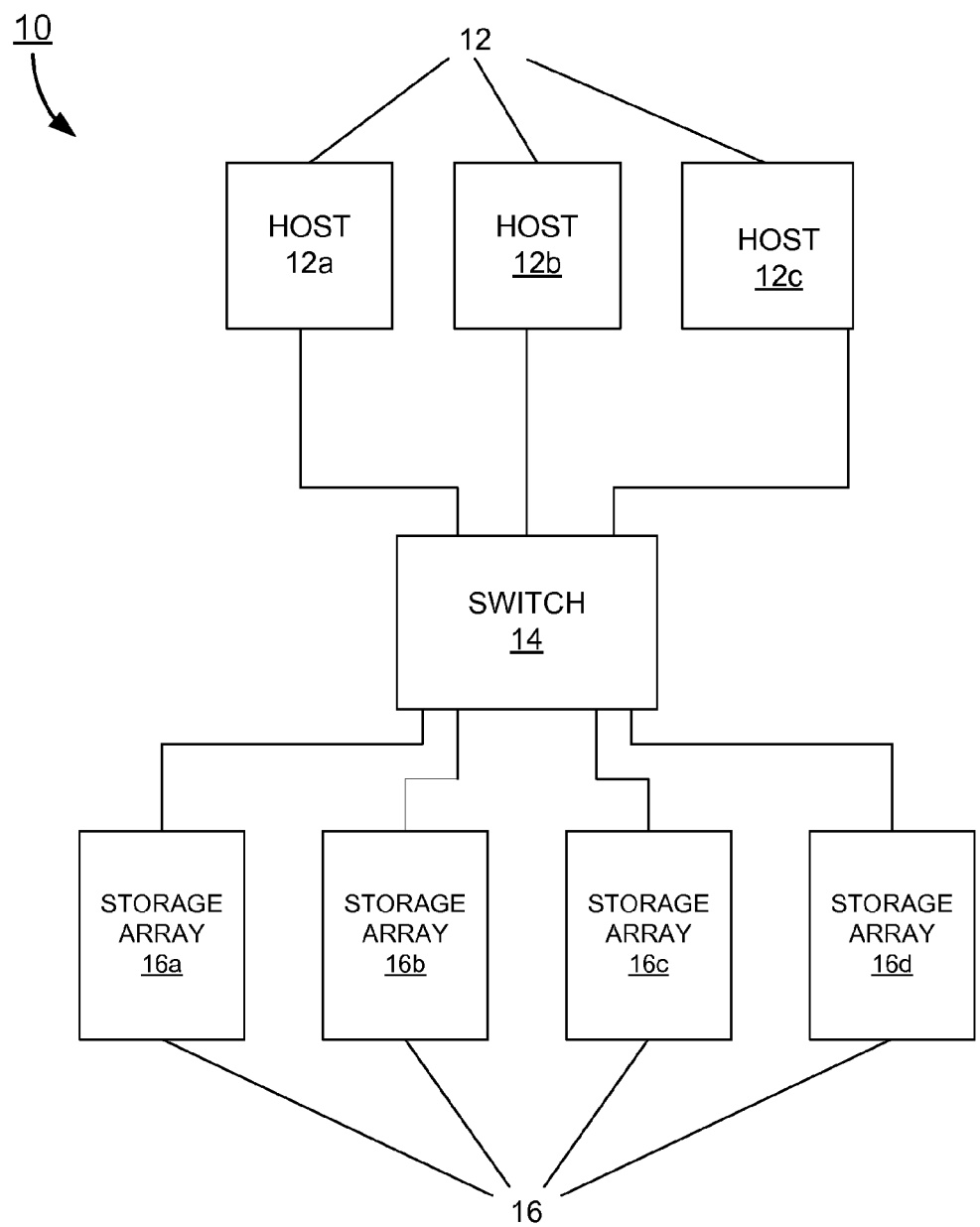
FIG. 1 is a functional block diagram of an embodiment of a storage area network (SAN) in communication with a plurality of hosts and with a management station, the SAN including multiple storage arrays coupled to the hosts through a switch fabric and to the management station through a network.

FIG. 1 shows an exemplary storage area network (SAN) 10 in which the invention can be implemented. The SAN 10 employs a Fibre Channel fabric topology. Fibre Channel is a high-speed serial transport used in storage systems. The transport is described in a series of standards that can be found at X3T9.3 Task Group of ANSI: Fibre Channel Physical and Signaling Interface (FC-PH), Rev. 4.2 Oct. 8, 1993. Hosts 12, shown individually as host 12a, host 12b, and host 12c, are coupled to the Fibre Channel fabric in the storage system, herein shown as a switch 14. Storage arrays 16, shown individually as 16a, 16b, 16c, and 16d, are also coupled to the switch 14. The hosts 12 communicate with disks or disk drives 58 (FIG. 2) of any of the storage arrays 16 using a cross-point Fibre Channel connection through the switch 14.

Figure 2:
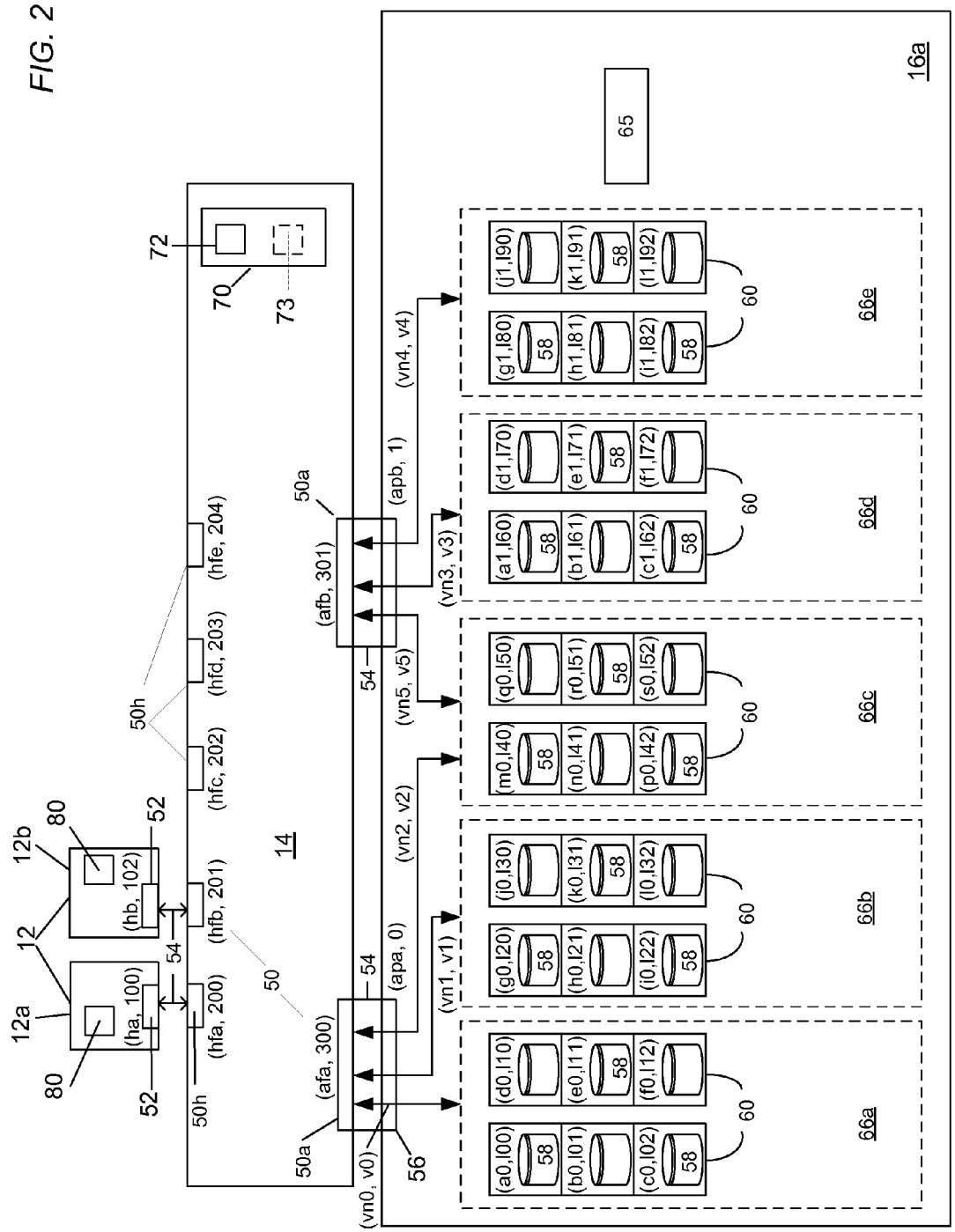
FIG. 2 is a representation of an embodiment of a SAN, wherein the logical units (LUNs) of storage in a storage array are arranged into storage groups (i.e., virtual arrays) and are separately addressable through virtual port identifiers (IDs).

FIG. 2 shows the hosts 12a, 12b, the storage array 16a, and the switch 14 in more detail. The switch 14 includes switch ports 50. As used herein, switch ports 50 that are coupled to a host are referred to as host-facing ports, and those that are coupled to a storage array are referred to as array-facing ports. Host-facing switch ports are labeled as 50h, array-facing switch ports are labeled as 50a. Host ports 52 on the hosts 12 are coupled by Fibre Channel links 54 to host-facing switch ports 50h on the switch 14. Physical array ports 56 on the array 16a are coupled by Fibre Channel links 54 to array-facing switch ports 50a on the switch 14.

The storage array 16a includes an array of disks 58 and a controller 65. The disks 58 are organized into logical units (LUNs) 60, originally a SCSI (small computer system interface) term, now commonly used to describe a logical unit of physical storage space. The storage array 16a exports the LUNs 60 over the Fibre Channel links 54 through the switch 14, for access by the hosts 12. As herein shown, each disk 58 is configured as a separate LUN 60, though it is understood that a LUN can encompass part of a disk, or parts of multiple disks, or multiple complete disks. The arrangement shown is chosen for convenience of description.

In a Fibre Channel system, such as that of FIG. 2, each Fibre Channel device (including, but not limited to, host ports, array ports, and LUNs) has two identifying characteristics—a name and an address. Fibre Channel names, known as "world wide names", are unique—every Fibre Channel device in the world has its own unique name. Each Fibre Channel device in a system also has an address, referred to in Fibre Channel parlance as an "ID". The Fibre Channel address is dynamic and dependent upon the configuration of the system. The IDs are used for directing information between the hosts 12 and the storage arrays 16 and LUNs 60 in the system. Port addresses are referred to as "port IDs". After initialization, the hosts 12 communicate with the storage arrays 16 and LUNs 60 by sending messages to the appropriate array port and LUN addresses. The hosts 12 adapt to new port and LUN addresses, but each device in use maintains its same name in order for uninterrupted communications to continue.

In a Fabric topology, the switch 14 assigns IDs to the host ports 52 and array ports 56 during initialization. IDs, as described in the Fibre Channel specification, are 24-bit quantities containing several fields. For purposes of this description, it is sufficient to understand that the ID assigned to an array port 56 is a derivative of the switch name and the ID of the switch port 50. Thus, an array port 56 name depends on the switch port 50 to which it is coupled.

Throughout this description, names and IDs are shown symbolically with alphanumeric symbols for simplicity of explanation. In FIG. 2, the names and IDs of each port and LUN are shown as a pair (name, ID). The host ports 52 for hosts 12a, 12b are shown to have name-ID pairs of (ha, 100) and (hb, 102), respectively. The name-ID pairs of the host-facing switch ports 50h are shown as (hfa, 200), (hfb, 201), (hfc, 202), and (hfd, 203). The host-facing port (hfa, 200) is coupled to the host port (ha, 100) on the host 12a and the host-facing port (hpb, 201) is coupled to the host port (hb, 102), on the host 12b.

Each array-facing switch port 50 and each array port 56 have a name and ID. In this exemplary illustration, the array ports 56 of the storage array 16a have name-ID pairs of (apa, 0) and (apb, 1). The array-facing switch ports 50 have the following name-ID pairs: array-facing switch port (afa, 300) is coupled to the array port 56 (apa, 0), and array-facing switch port (afb, 301) is coupled to an array port 56 (apb, 1).

Each LUN 60 in the array 16a also has a name and a LUN number, referred to as a name/number pair (LUN name, LUN number). As an example, the array 16a includes LUN with a name/number pair of (a0, L00)—the LUN has a name of "a0" and a LUN number of L00. In the example shown, the LUNs with LUN numbers L00, L01, L02, L10, L11, L12, L20, L21, L22, L30, L31, L32, L40, L41, L42, L50, L51, and L52 are accessible through the array port (apa, 0), and LUNs with LUN numbers L60, L61, L62, L70, L71, L72, L80, L81, L82, L90, L91, and L92 are accessible through array port (apb, 1).

The Fibre Channel switch 14 includes a name server database 70. The switch 14 uses the name server database 70 to assign IDs to host ports 52 and to array ports 56 during initialization. The name server database 70 includes a name server table 72 used by the switch 14 to resolve IDs to names. The name server table 72 includes multiple entries 74. Each entry 74 includes a port name field 76 and a port address field 78.

Figure 3:
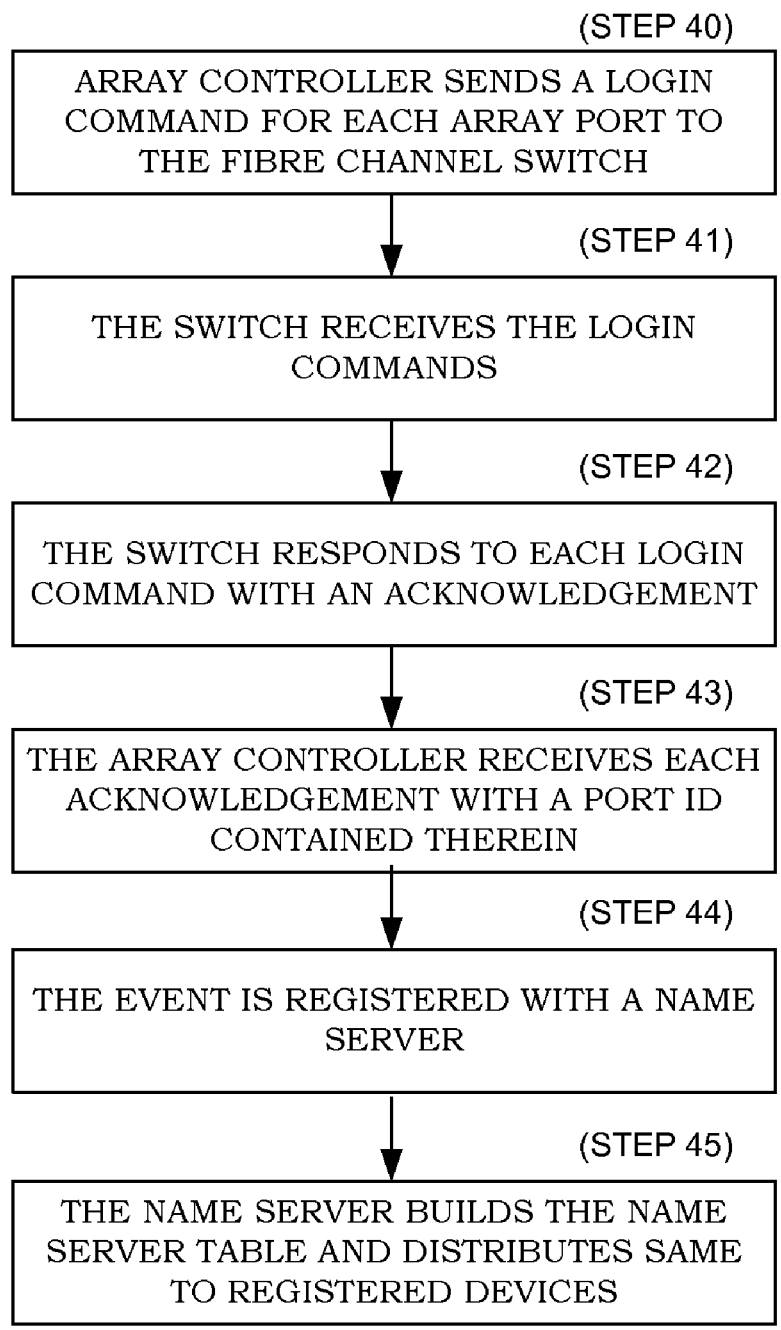
FIG. 3 is a flow diagram of an embodiment of a process by which the switch assigns port IDs to array ports of the storage array.

FIG. 3 shows an embodiment of a process by which Fibre Channel switch 14 assigns port IDs in accordance with the ANSI T11 Fibre Channel standards. In general, during initialization, a Fibre Channel device attached to a switch port, for example the array 16a, sends the names of the array ports 56 to the switch 14. In response, the name server database 70 sends, to the storage array 16a, an ID for each array port 56. The name server database 70 stores each array port name and corresponding ID in an entry 74 in the name server table 72. After the array 16a is initialized, the switch 14 sends the name server table 72 to all members of the SAN 10 registered to receive state change notifications. This includes the hosts 12 (and the management station 18). The hosts 12 have the IDs of the arrays 16 so that Fibre Channel communications between the hosts 12 and arrays 16 can ensue.

More specifically, the array controller 65 sends (step 40) a port login "FLOGI" command for each array port (i.e., ports 0 and 1) to the switch 14 containing the array port name. The switch (step 41) receives the port login commands and responds (step 42) by sending an acknowledgement message to the array controller 65. Each acknowledgement message contains a Port ID for the array port for which a login command has been sent. The array controller 65 receives (step 43)

the acknowledgement message. The event is registered (step 44) with a name server. During this registration process, the name server updates (step 45) the name server table 72 containing port names and their corresponding port IDs and distributes the table 72 to the devices registered to receive it.

FIG. 4 shows a portion of an exemplary embodiment of the name server table 72. The full contents of the name server table 72 are described in the Fibre Channel Name Server MIB, described in the IETF RFC 4044, "Fibre Channel Management MIB", herein incorporated by reference. In the example of FIG. 4, the name server table 72 includes entries 74 for the port names apa and apb. The port ID 0 and port ID 1 have been assigned by the Fibre Channel switch 14 to the port names apa and apb, respectively.

After the hosts 12 have IDs to access the array ports 56, they can learn what LUNs 60 are available. LUN names and numbers are managed at the array level. Each host 12 sends a query to each array port 56 ID, in turn, requesting a list of available LUN numbers. After the LUN numbers for a given array port ID are known, the host 12 is able to query each LUN 60 by using a combination of the port ID and LUN number to access the LUNs 60. The host 12 then queries each LUN 60 for its corresponding LUN name. After the host 12 has gathered this information, it builds a directory LUN table 80 that relates LUN names, to port IDs and LUN numbers.

FIG. 5 shows a representative embodiment of a LUN table 80. The LUN table 80 includes an entry 82 for each LUN 60 that the host has discovered. Each entry 82 includes a LUN name field 84, a port ID field 88, and a LUN number field 90, which, in combination, identify the LUN 60. In the portion of the table shown, the LUN table 80 for a host 12 includes the LUN names, port IDs, and LUN numbers for the LUNs 60 on the array 16a for each port ID 0 and 1. As representative examples, one entry 82 shows a LUN with name a0 and LUN number L00 associated with Port ID 0, and another entry 82 shows a LUN with name e1 and LUN number L71 associated with Port ID 1.

During operation, hosts 12 refer to LUNs 60 by their LUN numbers. To access a LUN 60, a host port 52 sends a message whose Fibre Channel address includes the array port ID and LUN number. The switch 14 parses the port ID portion of the address in order to forward the message to the identified array port 56. The array 16 then uses the LUN number portion of the address to access the proper LUN 60 within the array 16. For example, if host 12a needs to access LUN #L71, the host port 52 sends a message to an address that includes the port ID 1 and the LUN number 71. The switch 14 sees the port ID 1 and sends the message to the array port 56 with ID 1. The array 16a sees that the message is directed to the LUN # L71 and proceeds to perform the appropriate operation on LUN number 71.

Referring back to FIG. 2, the LUNs are arranged in several separately accessible sub-arrays or storage groups 66, also referred to herein as virtual arrays and individually labeled 66a, 66b, 66c, 66d, and 66e. The term "storage group" can have different meanings in different contexts. For example, a "storage group" in prior art, software-based virtual arrays include a host and a set of LUNs. For clarity, a "storage group" as used herein is a group of LUNs (i.e., without a host). As examples, a first storage group or virtual array 66a includes LUN numbers L00-L12, and a second storage group or virtual array 66b includes LUN numbers L20-L32.

In one embodiment, each host 12 or host application can have access to one virtual array, but not to the other virtual arrays within the storage array 16a. For example, the first virtual array 66a can be arranged to be accessible only to the host 12a, whereas the second virtual array 66b can be arranged to be accessible only to the host 12b. Such an arrangement can provide security against data corruption and can provide ease of management for host applications. In other embodiments, hosts 12 and host applications can have access to multiple virtual arrays.

The Fibre Channel controller 65 (shown), a separate controller, pre-configured software, dynamic user programming of the array 16, or any combination thereof, can determine which LUNs are within each storage group (i.e., presented virtual array 66).

Each virtual array 66 is associated with at least one unique "virtual port ID". Conversely, a virtual port ID is associated with only one virtual array. These virtual port IDs are established over each physical port (apa, apb) on the array 16a. In general, each presented virtual array 66 is assigned a number of virtual port IDs depending upon a number of physical ports through which that virtual array is accessible. In the example shown, the virtual array 66a is associated with the physical array Port ID 0 and is assigned one virtual port ID v0. The virtual array 66b is associated with the physical array Port ID 0, and is assigned one virtual port ID v1. The virtual array 66c is associated with the physical array port having Port ID 0 and with the array port having Port ID 1. Thus, the virtual array 66c is assigned two virtual port IDs v2 and v5. The virtual arrays 66d, 66e are each associated with the physical array port ID 1 and are assigned virtual port IDs v3 and v4, respectively. Accordingly, each virtual array 66 has assigned thereto at least one virtual port ID by which the hosts 12 can access the LUNs that are within that virtual array.

Figure 6:
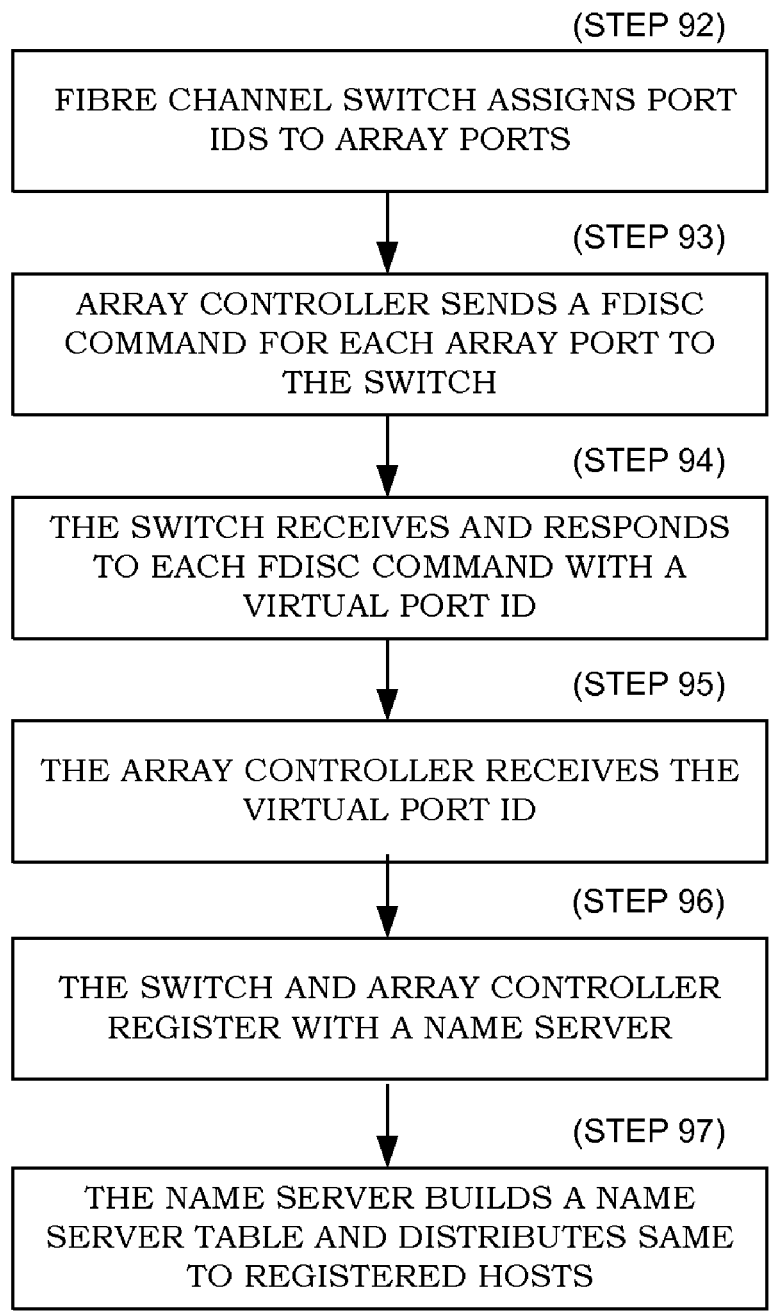
FIG. 6 is a flow diagram of an embodiment of a process for assigning virtual port IDs to array ports of the storage array.

In one embodiment, the switch 14 assigns the virtual port IDs. The ANSI T11 Fibre Channel standards, which define Fibre Channel virtual ports used by hosts, may be extended to support storage arrays. FIG. 6 shows an embodiment of a process by which the switch, in conjunction with the Fibre Channel array controller 65, assigns virtual port IDs.

At step 92, the switch 14 assigns port IDs to the array ports 56 and constructs the name server table 72 as described in connection with FIG. 3. To assign a virtual port ID to each array port 56, the array controller 65 sends (step 93) an "FDISC" command containing a virtual port name for that array port to the switch 14. The switch 14 receives the FDISC command and responds (step 94) by sending a virtual port ID to the array controller 65. The array controller 65 receives (step 95) the virtual port ID from the switch 14. The switch 14 and array controller 65 then perform the registration process to add the virtual port name and virtual port ID to the name server table 72. The sending of a FDISC command and issuing of a response repeats for each virtual port ID assigned for each physical array port. The name server builds and distributes to the devices (step 97) a name server table 72', in a manner similar to that previously described with respect to name server table 72, except the name server table 72' associates multiple virtual port IDs with the physical port names.

FIG. 7 shows an example of such a name server table 72', including entries 74'. Each entry 74' has a port name field 76, a port ID field 78, a virtual port name field 98, and a virtual port ID field 99. In the example shown, the name server table 72' associates the physical array port apa with Port ID 0, and with the virtual port names/IDs of (vn0, v0), (vn1, v1), and (vn2, v2). The physical array port apb is associated with Port ID 1 and with the virtual port names/IDs of (vn3, v3), (vn4, v4), and (vn5, v5). Upon receiving the name server table 72', the hosts 12 receive the virtual port IDs of v0, v1, v2, v3, v4, and v5.

After receiving the virtual port IDs, the hosts 12 build their directory LUN tables 80' in a manner similar to that previously described with regard to FIG. 5, except that each virtual port ID is associated with LUN names and numbers. Accordingly, each host 12 sends a query to each virtual array port ID (here, e.g., v0-v5), in turn, requesting a list of available LUN numbers. Hosts 12 do not distinguish between virtual and physical port IDs. The hosts 12 do not recognize that they are using virtual port IDs to communicate with the storage arrays. From the hosts' perspective, the port IDs are physical port IDs (although, in actuality, the port IDs are virtual port IDs).

After the LUN numbers for a given virtual array port ID are known, the host is able to query each LUN 60 by using a combination of the virtual port ID and LUN number to access the LUN. The host 12 then queries each LUN 60 for its corresponding LUN name. After the host has gathered this information, it builds a directory LUN table 80' that relates LUN names, virtual port IDs, and LUN numbers.

FIG. 8 shows an exemplary representation of the LUN table 80', including an entry 82' for each discovered LUN. Each entry 82' includes a LUN name field 84, a virtual port ID field 86, and a LUN number field 90, which, in combination identify the LUN. For example, the LUNs 60 associated with the presented virtual array 66a—i.e. virtual port ID v0—are (a0, L00), (b0, L01), (c0, L02), (d0, L10), (e0, L11), and (f0, L12). Note also that the presented virtual array 66c (LUNs L40-L52) is dual-ported; that is, it is accessible through virtual port IDs v2 and v5. LUNs in dual-ported presented virtual arrays may have two separate LUN numbers as well, one for use when accessed on the first virtual port ID, and the second for use when accessed on the second virtual port ID. Dual-ported presented virtual arrays can be useful for high availability purposes.

The provision of unique virtual IDs for each virtual array 66 allows the switch 14 to apply zoning such that each host 12 has access to a designated virtual array only. Because each presented virtual array 66 is associated with its own unique virtual Port ID v0, v1, v2, v3, v4, or v5, the switch 14 can differentiate between each presented virtual array 66 based upon its virtual Port ID. The switch 14 can be programmed to allow or disallow access to each virtual port address from each host-facing array port address using its zoning process. Host access to the presented virtual arrays 66 can thus be physically separated, enhancing security, data integrity, and ease of storage management for host applications.

Referring back to FIG. 2, in one embodiment the name server database 70 at the switch 14 includes a zoning table 73 (in phantom) and the name server table 72. In general, the zoning table 73 associates virtual array port IDs with host-facing port IDs. FIG. 9 shows an embodiment of the zoning table 73. Only those portions of the zoning table 73 relevant to an understanding of the invention are shown. Accordingly, the zoning table 73 has entries 252 including a virtual port ID field 254 and a host facing switch port ID field 256.

For each virtual port ID recognized by the switch 14, the name server database 70 can associate one or more host-facing switch port IDs with the virtual port ID. For example, in the exemplary zoning table 73 shown, virtual port ID v0 is associated with host-facing switch port ID 200. Virtual port ID v1 is associated with host-facing switch port ID 201. Virtual port ID v2 is associated with host-facing switch port ID 202. Virtual port ID v4 is associated with host-facing switch port ID 204. Virtual port ID v5 is associated with host-facing switch port ID 202. (Host-facing array port 202 is dual-ported on virtual port IDs v2 and v5.)

When the switch 14 sends an update to the hosts 12 with the contents of the name server table 72, the switch 14 uses the zoning table 73 to filter the presentation of the information in the name server table 72 to the hosts 12. FIG. 10 and FIG. 11 show examples of the LUN tables 80a', 80b' that can be maintained at the hosts 12a, 12b respectively. When the switch 14 updates the hosts 12, the switch 14 refers to the zoning table 73 (e.g., as shown in FIG. 9).

Figure 12:
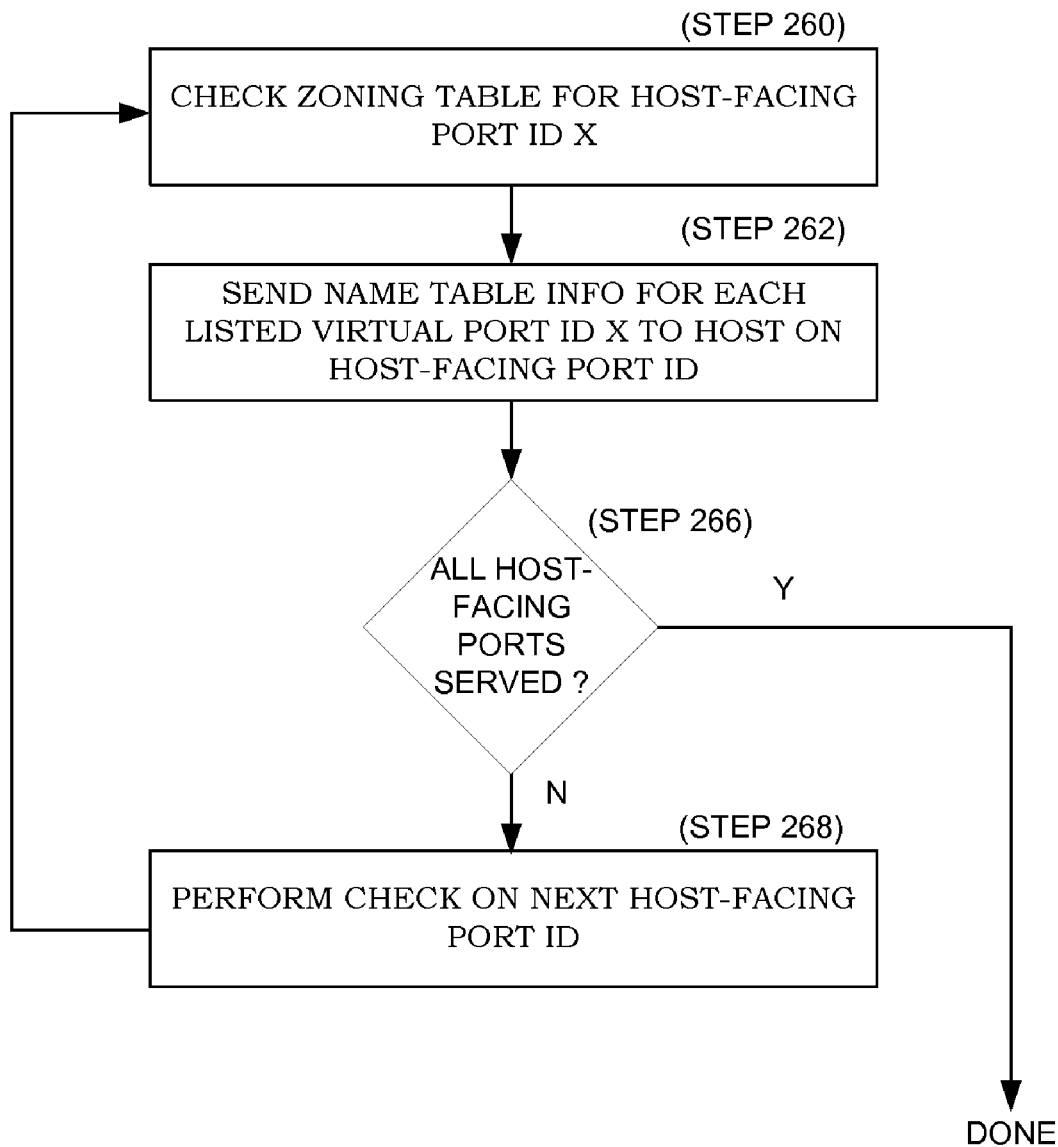
FIG. 12 is a flow diagram representing the operation of the switch when a zoning table is in use.

FIG. 12 shows an embodiment of a process by which the switch 14 uses the zoning table 73. The switch 14 checks (step 260) the zoning table 73 for the first host-facing port ID 200. The switch 14 determines that the host-facing array port ID 200 is authorized to access only virtual array port v0. Consequently, the switch 14 forwards (step 262) the name table information associated with virtual port ID 0 to the host 12a, which is coupled to the host-facing switch port ID 200. Any information in the name server table 72 associated with any of the other virtual port IDs is not sent to the host 12a. The host 12a thus receives address information for the virtual port v0, resulting in a LUN table 80a' at the host 12a as shown in FIG. 10. Access by the host 12a is limited to the LUNs L00-L12 on virtual Port ID v0.

The switch 14 then determines (step 266) whether there are other host-facing ports to serve. In this example, the switch 14 checks (step 268) the zoning table 73 for access information for the host-facing switch port ID 201 (steps 266, 268, 260). The switch 14 determines that the host-facing switch port ID 201 is authorized to access virtual array port v1. Consequently, the switch 14 forwards (step 262) the information in the name server table 72 associated with virtual array port v1 to the host 12b that is coupled to the host-facing switch port ID 201. The host 12b receives the address information for the virtual port v1, resulting in a LUN table 80b' at the host 12b as shown in FIG. 11. The host 12b is limited to access to the LUNs L20-L32 on virtual Port ID v1. This process continues for each host-facing switch port ID (steps 266-262). Use of the zoning table 73 can thus limit access by each host to certain LUNs 60 on the virtual array ports, rather than to all LUNs 30 on a physical array port 56.

Figure 13:
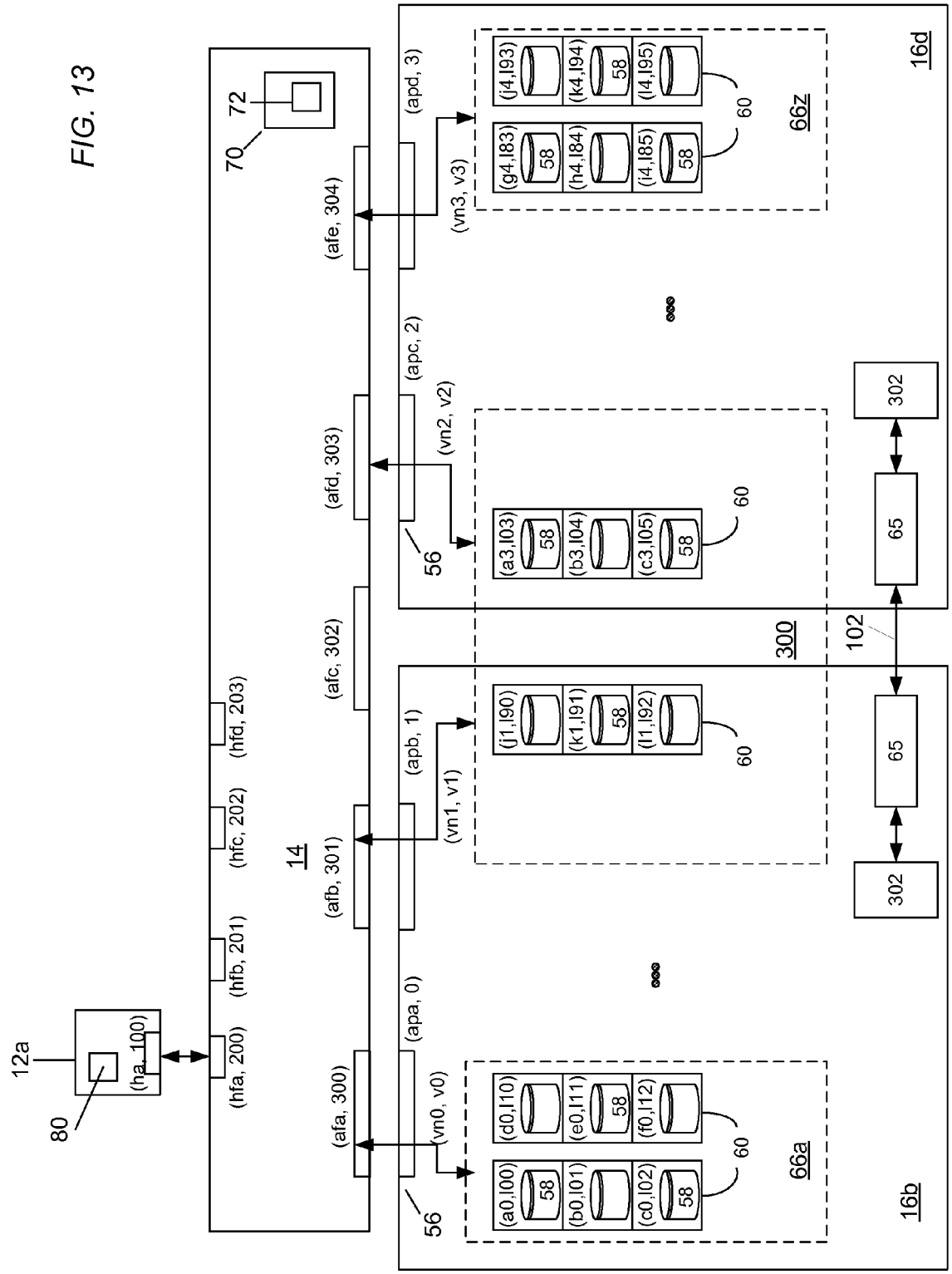
FIG. 13 is a representation of an embodiment of a SAN, wherein the LUNs of a virtual array are arranged to span multiple physical storage arrays.

FIG. 13 shows an embodiment of the SAN 10 in which a virtual array 300 is arranged to span multiple physical storage arrays (here, storage arrays 16a and 16b). The virtual array 300 includes LUNs from both storage arrays 16a, 16b. More specifically, the virtual array 300 comprises LUN numbers L90, L91, and L92 from the array 16a and LUN numbers L03, L04, and L05 from the array 16b. Although only two physical arrays are shown, it is to be understood that the principles of the invention apply also to virtual arrays that span more than two physical arrays.

The determination of which LUNs are within the virtual array 300 may be accomplished by the Fibre Channel controllers 65, independently or cooperatively, a separate controller, pre-configured software, dynamic user programming of the array 16, or any combination thereof. Each storage array 16a, 16b can notify the other storage array as to which LUNs are in the virtual array 300 (e.g., through the controllers 65). Each storage array 16, 16b can thus maintain a table 302 that identifies the LUNs of both arrays that are included the virtual array 300.

In this example, there are multiple array ports through which hosts 12 can access the LUNs in the virtual array 300. Accordingly, the virtual array 300 is dual-ported. One such array port, named apb, is in the array 16a, and another such array port, named apc, is in the array 16b. The array port apb is coupled to the LUNs numbered L90, L91, and L92 of array 16a, and the array port apc is coupled to the LUN numbers L03, L04, and L05 of the array 16b. During the assignment of virtual port IDs to the array ports, as described above, the switch 14 and controllers 66 establish exemplary virtual port name/port IDs of (vn1, v1) and (vn2, v2).

To access a LUN in the virtual array 300, the switch 14 can route a message from a host through either of the array ports apb, apc. Messages can arrive at one of the arrays that are addressed to a LUN in the other array. In such instances, the array controller 65 forwards the message to the other array over the communications link 102. (The array controller 65 can determine to which array a message is addressed by consulting the table 302). The other array can send a reply back over the communications link 102 or reply to the originating host 12 directly through the switch 14. If the reply goes back to the array that originally received the message, that array sends the reply to the originating host. Any transport mechanism can be employed to exchange messages over the communications link 102.

Storage arrays that share a virtual array with one or more other storage arrays can also have other shared or unshared virtual arrays. In the example shown, each physical storage array 16a, 16b also has at least one unshared virtual array 66a, 66z, respectively. More specifically, the array 16a includes the virtual array 66a comprised of LUN numbers L00, L01, L01, L10, L11, and L12. The array 16b includes the virtual array 66z comprised of LUN numbers L83, L84, L85, L93, L94, and L95.

No restriction exists to the number of LUNs that each storage array contributes to a shared virtual array or to the number of LUNs in the shared virtual array. For example, the storage array 16a, 16b can contribute unequal numbers of LUNs to the shared virtual array 300, although in FIG. 6, both are shown to contribute three LUNs. Moreover, the size of a shared virtual array may differ from the unshared arrays, if any, in the same storage arrays, although in FIG. 6, the size of the virtual array 300 is shown to be the same as the unshared arrays 66a, 66z.

FIG. 14 shows an example of a name server table 72' that may be built to associate the port names of the array port 56 with the virtual port names and virtual port IDs. As can be done for unshared virtual arrays, the switch 14 can use the zoning table 73 to filter the information in the name server table 72' to determine the designated host that may access the virtual array 300.

FIG. 15 shows an example of a LUN table 80' that hosts 12 may build to associate LUN names and LUN numbers with virtual port IDs, as described above. Each host 12 sends a query to each virtual array port ID (here, e.g., v0-v3), in turn, requesting a list of available LUN numbers. After the LUN numbers for a given virtual array port ID are known, the host is able to query each LUN 60 by using a combination of the virtual port ID and LUN number to access the LUN. The host 12 then queries each LUN 60 for its corresponding LUN name. After the host has gathered this information, it builds a directory LUN table 80' that relates LUN names, virtual port IDs, and LUN numbers.

FIGS. 16-23 show various embodiments of virtual arrays that span multiple storage arrays. The various embodiments are not meant to be exhaustive: there can be numerous other configurations of virtual arrays that span multiple storage arrays beyond what are shown in these FIGs. In each of these FIGs., the hosts 12, ports 56, and Fibre Channel switch 14 are not shown to simplify the illustration.

Figure 16:
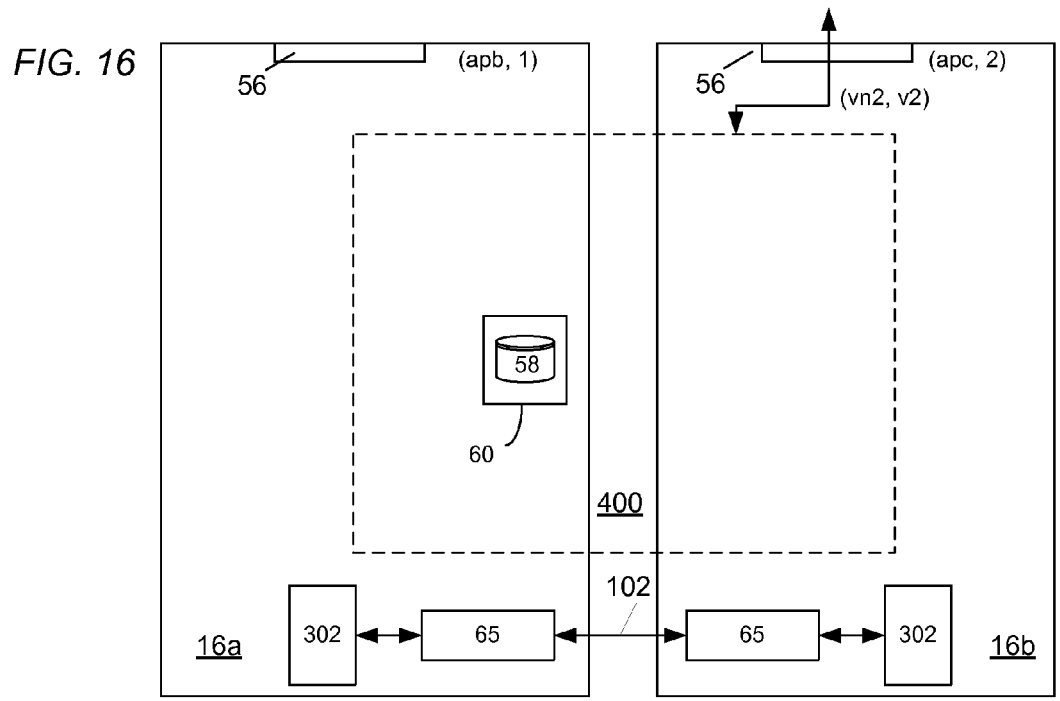
FIGS. 16-23 are various embodiments of virtual arrays that span multiple storage arrays.

FIG. 16 shows an embodiment of a virtual array 400 shared by two storage arrays 16a, 16b. The virtual array 400 includes at least one LUN 60 from the storage array 16a, whereas the storage array 16b has no LUNs that belong to the virtual array 400. The storage array 16b has an array port, named apb, that is coupled to the virtual array 400, whereas there are no array ports from storage array 16a that are coupled to the virtual array. To access the LUN 60 in the virtual array 400, the switch 14 routes a message from a host through the array port apb. The array controller 65 of the storage array 16b forwards the message to the other storage array 16a over the communications link 102.

Figure 17:
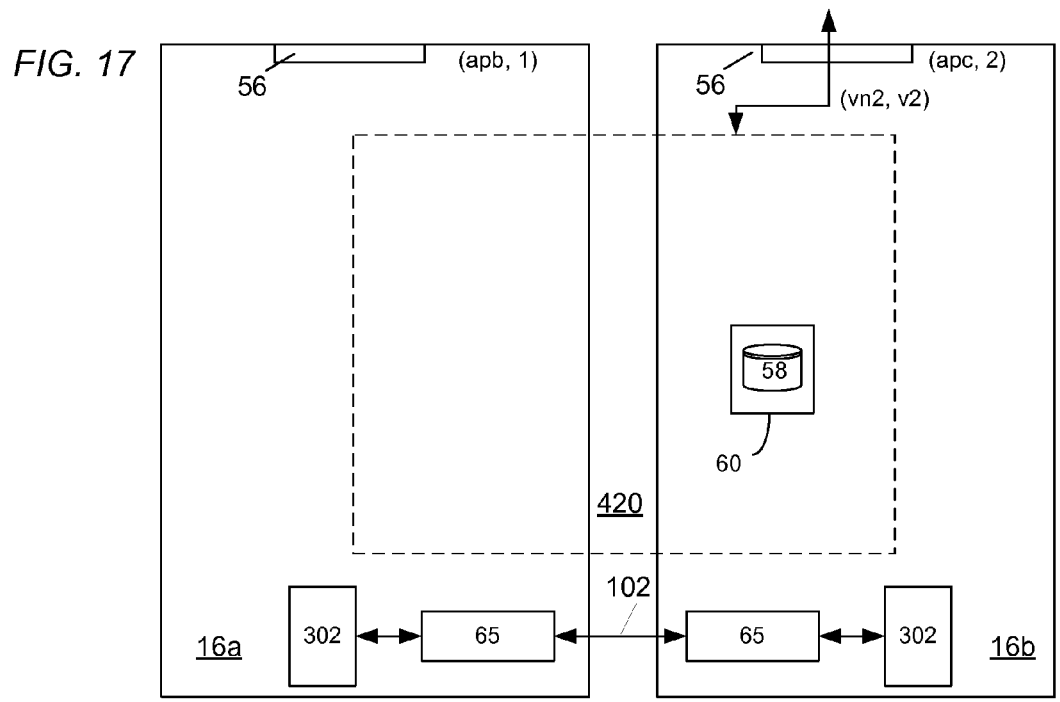

FIG. 17 shows another embodiment of a virtual array 420 shared by two storage arrays 16a, 16b. This embodiment is similar to the embodiment shown in FIG. 16, except that each LUN 60 belonging to the virtual array 420 resides at the storage array 16b, whereas the storage array 16a contributes no LUNs to the virtual array 420. In addition, the storage array 16b has an array port, named apb, that is coupled to the virtual array 400, whereas there are no array ports from the storage array 16a that are coupled to the virtual array 420.

Figure 18:
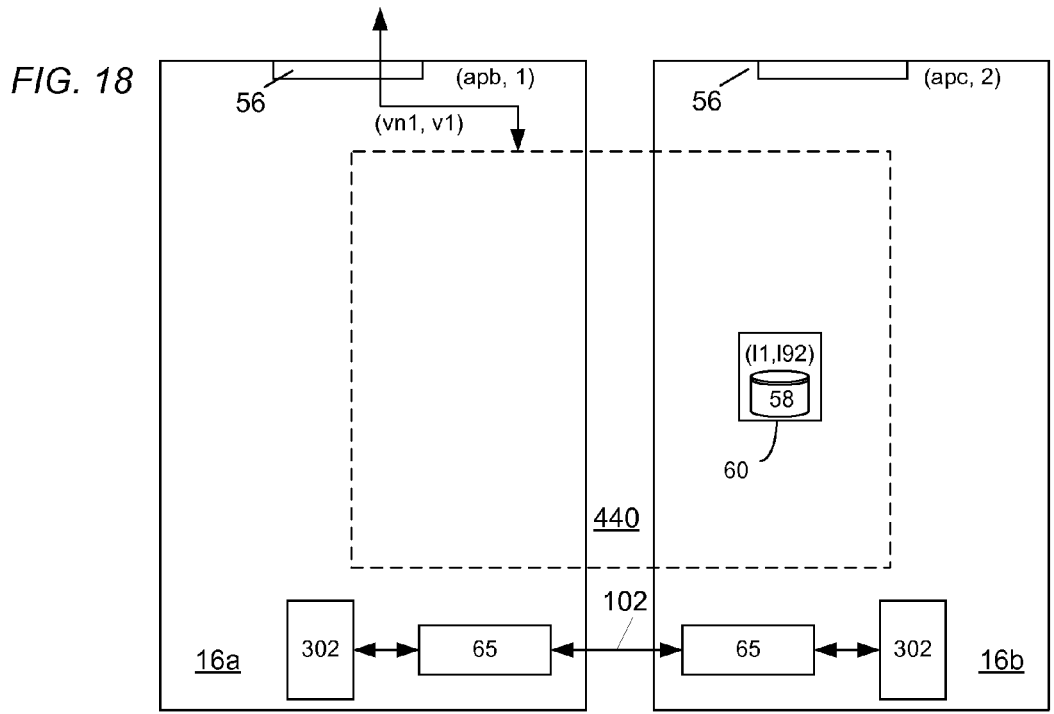
Figure 19:
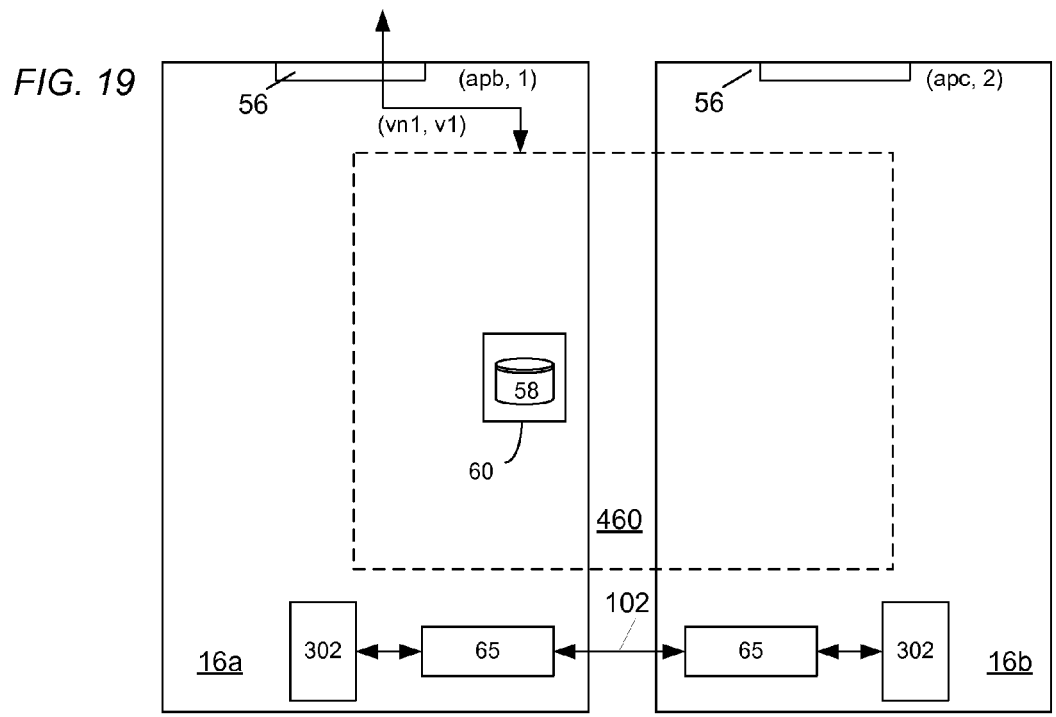

The embodiments of shared virtual arrays 440, 460 shown in FIG. 18 and FIG. 19, respectively, are converses of the respective embodiments shown in FIG. 16 and FIG. 17. In FIG. 18, the physical port that is coupled to the virtual array 440 belongs to the storage array 16a, and the LUN 60 that belongs to the virtual array 440 belongs to the other storage array 16b. In FIG. 19, the storage array 16a has the physical port that is coupled to the virtual array 460 and the LUN 60 that belongs to the virtual array 460.

Figure 20:
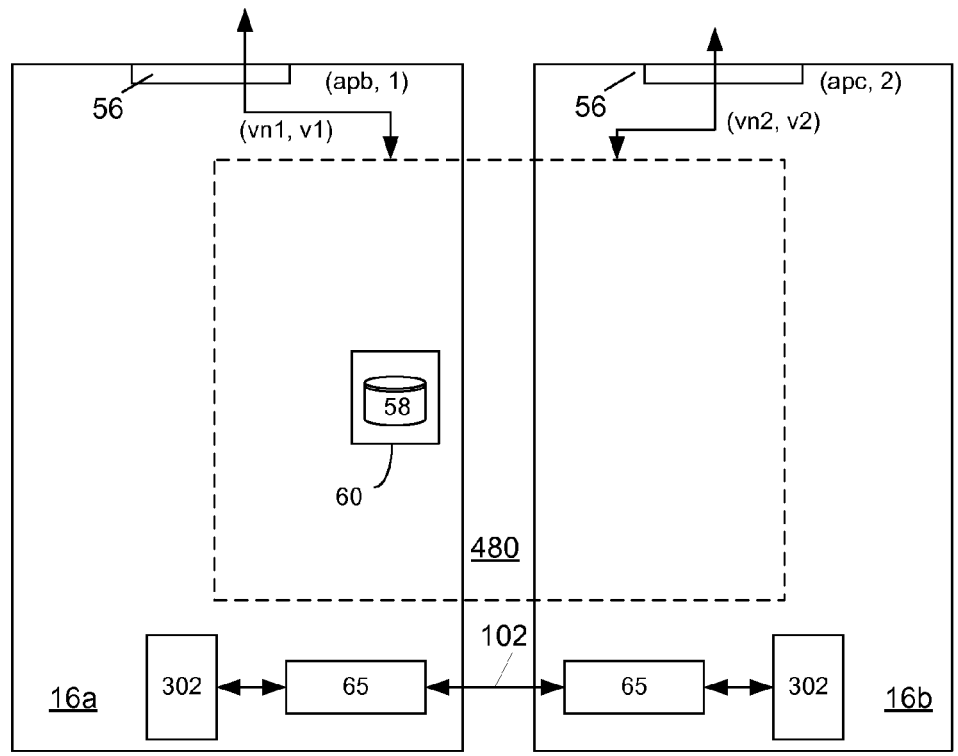
Figure 21:
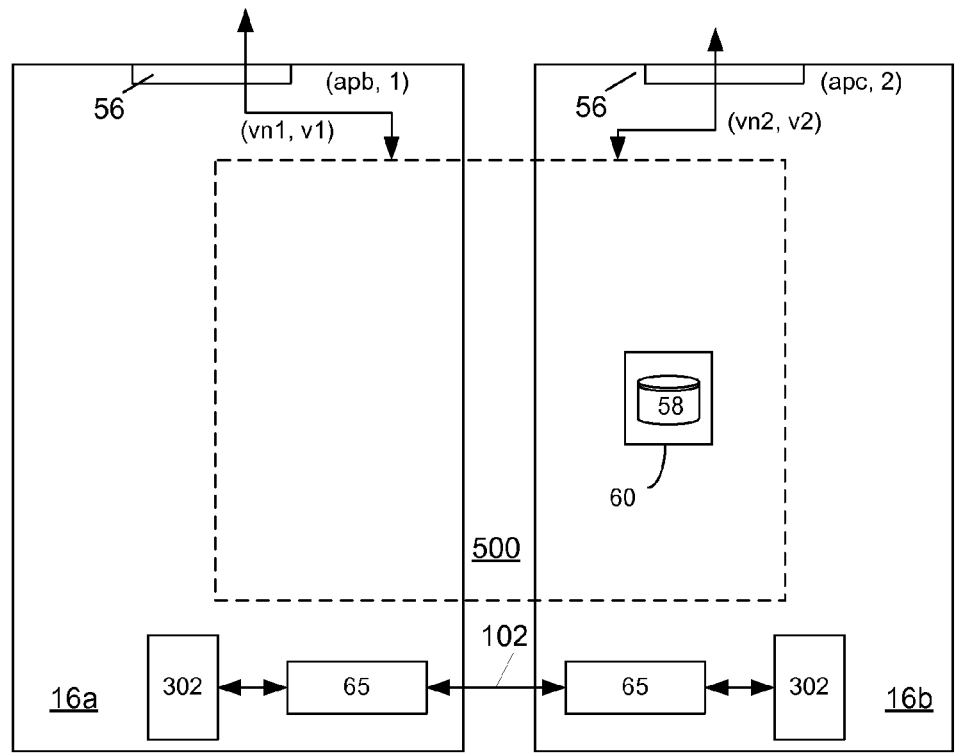

FIG. 20 and FIG. 21 show embodiments of virtual arrays 480, 500 in which each storage array 16a, 16b has a physical port that is coupled to the virtual array. In FIG. 20, the storage array 16a has a LUN 60 that belongs to the virtual array 480, whereas the storage array 16b has none. In FIG. 21, the storage array 16b has a LUN that belongs to the virtual array 500, whereas the storage array 16a has none.

Figure 22:
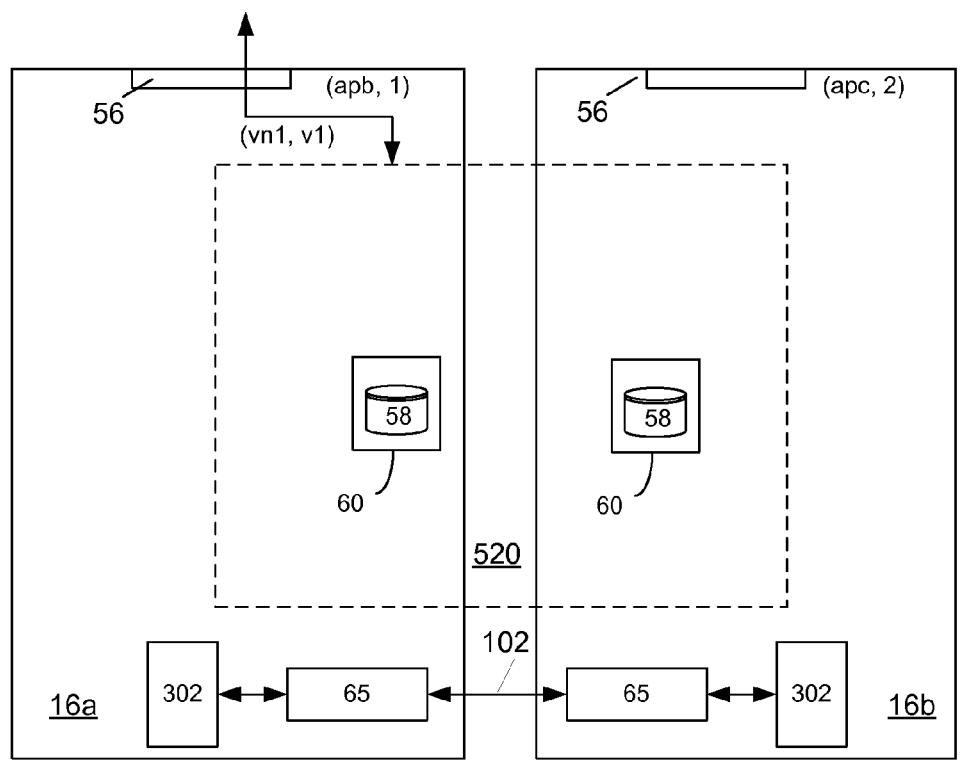
Figure 23:
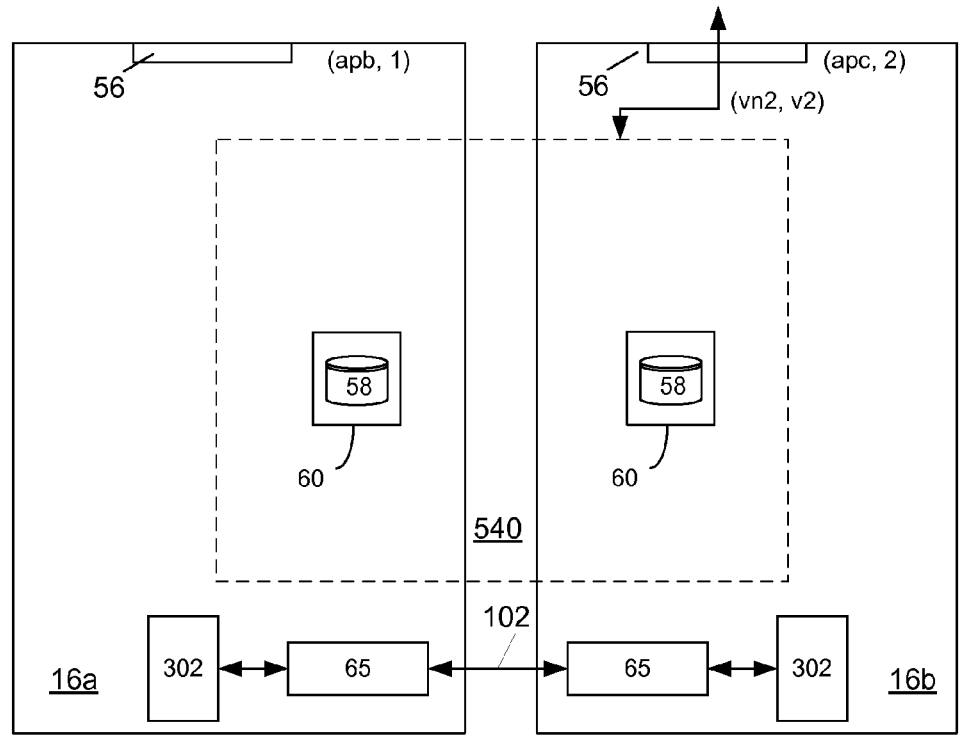

FIG. 22 and FIG. 23 show embodiments of virtual arrays 520, 540 in which each storage array 16a, 16b contributes a LUN to the shared virtual array. In FIG. 22, the storage array 16a has a physical port that is coupled to the virtual array 520, whereas the storage array 16b has none. In FIG. 23, the storage array 16b has a physical port that is coupled to the virtual array 540, whereas the storage array 16a has none.

Aspects of the present invention may be implemented, in whole or in part, as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims. For example, the array controllers 65 can be implemented in hardware, software, or combinations thereof. As another example, although the invention has been described primarily with reference to Fibre Channel arrays, switches, and ports, it is to be understood that the principles of the invention apply to other types of devices and transports for use with other types of storage protocols, e.g., iSCSI (Internet Small Computer System Interface).

What is claimed is:

1. A storage network comprising:
   a first storage array and a second storage array, at least one of the first and second storage arrays having one or more logical units of storage assigned to a virtual array that spans the first and second storage arrays, at least one of the first and second storage arrays having one or more physical ports coupled to the virtual array, the virtual array being assigned a unique virtual port identifier (ID) for each physical port coupled to the virtual array.

2. The storage network of claim 1, further comprising a communication link between the first storage array and the second storage array, each of the first storage array and the second storage array redirecting an input/output (I/O) request, received by that storage array, over the communication link to the other storage array when the I/O request is addressed to a logical unit of the other storage array.

3. The storage network of claim 1, further comprising a Fibre Channel switch coupled to each physical port.

4. The storage network of claim 3, wherein the virtual port IDs are assignable by the switch.

5. The storage network of claim 3, wherein a virtual port ID is used by a host coupled to the switch to exchange data with the virtual array using one of the assigned virtual port IDs.

6. The storage network of claim 3, wherein the switch to which the virtual array can be coupled comprises:
a plurality of ports, each port being coupled to a host; and
a zoning table associating each virtual port ID to one of the ports.

7. The storage network of claim 6, wherein the virtual array communicates only with a host coupled to a port associated with one of the virtual port IDs assigned to the virtual array.

8. The storage network of claim 1, wherein the virtual array spans more than two storage arrays.

9. A method of presenting a virtual array in a storage network, the method comprising:
arranging at least one logical unit of storage in at least one of a first storage array and a second storage array into a virtual array that spans the first and second storage arrays;
coupling the virtual array to a switch through at least one physical port of at least one of the first and second storage arrays; and
assigning to the virtual array a unique virtual port identifier (ID) for each physical port that couples the virtual array to the switch.

10. The method of claim 9, further comprising the steps of:
receiving an input/output (I/O) request by one of the first and second storage arrays;
determining that the I/O request is addressed to a logical unit of the other of the first and second storage arrays; and
forwarding the I/O request to the other of the first and second storage arrays over a communication link between the first storage array and the second storage array.

11. The method of claim 9, wherein the step of assigning a unique virtual port identifier (ID) for each physical port is performed by the switch.

12. The method of claim 9, further including the steps of:
coupling a host to the switch;
exchanging data between the host and the virtual array using one of the virtual port IDs assigned to the virtual array.

13. The method of claim 12, wherein the switch comprises ports, each port being coupled to the host, and further comprising the step of generating a zoning table that associates each virtual port ID to one of the ports.

14. The method of claim 13, further comprising the step of limiting communication with the virtual array to the host with a port associated with one of the virtual port ID associated with the virtual array.

15. The method of claim 13, wherein the virtual array spans more than two storage arrays.

16. A storage system comprising:
a host; and
a virtual array spanning a plurality of storage arrays, at least one of the storage arrays having one or more logical units of storage assigned to the virtual array and at least one of the storage arrays having a physical port coupled to the virtual array, the virtual array being assigned a unique virtual port identifier (ID) for each physical port coupled to the virtual array,
wherein the host communicates with the virtual array using a virtual port ID assigned to the virtual array.

17. The system of claim 16, further comprising a communication link between two of the storage arrays sharing the virtual array, each of said storage arrays redirecting an input/output (I/O) request, received by that storage array, over the communication link to the other storage array when the I/O request is addressed to a logical unit of the other storage array.

18. The system of claim 16, further comprising a switch coupled to each host and each storage array, wherein the switch assigns the virtual port IDs to the virtual array.

19. The system of claim 18, wherein the switch comprises:
ports by which the hosts are coupled to the switch; and
a zoning table for associating each virtual port ID with one of the ports.

20. The system of claim 19, wherein each host communicates with the virtual array if that host is coupled to a port associated with one of the virtual port IDs assigned to the virtual array.

21. The system of claim 16, wherein each virtual port ID may be used by one of the hosts to exchange data with the virtual array.

22. The storage system of claim 16, wherein the virtual array spans more than two storage arrays.

* * * * *